US010145153B2

(12) United States Patent
Faigle et al.

(10) Patent No.: US 10,145,153 B2
(45) Date of Patent: Dec. 4, 2018

(54) CLOSING ELEMENT, IN PARTICULAR FOR A MOTOR VEHICLE

(71) Applicant: Marquardt GmbH, Rietheim-Weilheim (DE)

(72) Inventors: Martin Faigle, Burladingen (DE); Mario Reger, Wehingen (DE); Heinrich Wiens, Frittlingen (DE)

(73) Assignee: Marquardt GmbH, Rietheim-Weilheim (DE)

( * ) Notice: Subject to any disclaimer, the term of this patent is extended or adjusted under 35 U.S.C. 154(b) by 0 days.

(21) Appl. No.: 15/249,757

(22) Filed: Aug. 29, 2016

(65) Prior Publication Data

US 2017/0058576 A1 Mar. 2, 2017

(30) Foreign Application Priority Data

Aug. 31, 2015 (DE) ........................ 10 2015 011 127

(51) Int. Cl.
*B60R 25/00* (2013.01)
*E05B 81/82* (2014.01)
*E05B 81/90* (2014.01)
*E05B 81/78* (2014.01)
*E05B 47/00* (2006.01)

(52) U.S. Cl.
CPC .............. *E05B 81/82* (2013.01); *E05B 81/77* (2013.01); *E05B 81/90* (2013.01); *E05B 81/78* (2013.01); *E05B 2047/0097* (2013.01)

(58) Field of Classification Search
CPC .......... E05B 81/82; E05B 81/77; E05B 81/90; E05B 2047/0097; E05B 81/78
USPC ..... 340/5.72, 5.61, 5.64, 5.7, 12.51; 292/21, 292/118, 256, 336.3; 307/10.1
See application file for complete search history.

(56) References Cited

U.S. PATENT DOCUMENTS

| | | | | |
|---|---|---|---|---|
| 2014/0347163 A1 | 11/2014 | Banter et al. | | |
| 2016/0010365 A1* | 1/2016 | Hanaki | .................. | E05B 81/14 292/21 |
| 2016/0340940 A1* | 11/2016 | Krishnan | ................ | E05B 81/86 |

FOREIGN PATENT DOCUMENTS

| | | |
|---|---|---|
| DE | 601 12 580 T2 | 6/2006 |
| DE | 11 2013 000 497 T5 | 12/2014 |
| DE | 10 2014 002 379 A1 | 8/2015 |

(Continued)

OTHER PUBLICATIONS

German Search Report (Application No. 10 2015 011 127.2) dated Apr. 15, 2016.

*Primary Examiner* — Dhaval Patel
(74) *Attorney, Agent, or Firm* — Burr & Brown, PLLC

(57) ABSTRACT

A closing element for a motor vehicle, including an opening mechanism, and a handling element for the closing element actively connected to the opening mechanism such that the closing element can be moved for the purpose of opening. The closing element includes a locking mechanism for locking and/or unlocking the opening mechanism. The locking mechanism can be actuated by a closing system, in particular for the authorization of access to the motor vehicle. A coupling mechanism is provided for interacting with the locking mechanism and/or with the opening mechanism in the manner of an emergency release. The coupling mechanism can be actuated by an actuator. For the operation of the actuator a separate energy storage device is provided that can be used on demand.

8 Claims, 5 Drawing Sheets

(56) References Cited

FOREIGN PATENT DOCUMENTS

EP 1 300 532 A1 4/2003

* cited by examiner

CLOSING ELEMENT, IN PARTICULAR FOR A MOTOR VEHICLE

FIELD OF THE INVENTION

The present invention relates to a closing element.

BACKGROUND OF THE INVENTION

Such a closing element serves for closing and/or for opening access to a chamber. Particularly in the case of a motor vehicle, the closing element may be the door of a car, the tailgate or the like.

A closing element of such a type exhibits an opening mechanism and a handling element. The closing element further exhibits a locking mechanism for locking and/or unlocking the opening mechanism. The handling element is capable of being actively connected to the opening mechanism in such a manner that in the case of an unlocked locking mechanism the closing element is capable of being moved for the purpose of opening. The locking mechanism is capable of being actuated by means of a closing system including an electronic key, in particular for the authorization of access to the motor vehicle of the authorized user possessing the electronic key, for the purpose of locking and/or unlocking the opening mechanism.

Emergencies may arise—for example, in the case of a flat battery of the electronic key—in which the actuation by the closing system fails. For such emergencies, a mechanical lock has hitherto been additionally provided on the closing element, which permits the actuation of the locking mechanism by means of a mechanical emergency key. Besides the lack of security against theft by reason of the mechanical lock, this also results in an additional outlay for the closing element.

SUMMARY OF THE INVENTION

The object underlying the present invention is to develop the closing element further in such a manner that the mechanical lock and also the mechanical emergency key can be dispensed with.

In the case of the closing element according to the present invention a coupling mechanism is provided for interacting with the locking mechanism and/or with the opening mechanism in the manner of an emergency release. For example, in the event of the failure of a battery for the power supply in the motor vehicle, of a battery for the power supply of the locking mechanism, of a battery for the power supply of the closing system, such as the battery for the electronic key or such like, the coupling mechanism serves in particular for emergency operation of the closing system and/or of the locking mechanism. For this purpose the coupling mechanism is capable of being actuated for the interaction by means of an actuator. For the operation of the actuator, a separate energy storage means is provided that can be used on demand. Advantageously, in the case of the closing element according to the invention a mechanical door lock and also a mechanical emergency key can therefore be dispensed with, in which case an enhancement of the operational reliability of the closing element can furthermore be ascertained. Further configurations of the invention are the subject-matter of the dependent claims.

In a further configuration, in which, in particular, the security against theft is enhanced, the closing system may include a first device, designed as a control device, for the actuation of the locking mechanism, and an associated second device, designed in the manner of an electronic key, an ID transducer, a chip card or such like. The two devices may possess, for the designated operation thereof, transmitters and/or receivers for, in particular, electromagnetic signals. In the case of at least one of the signals transmitted between the second device and the first device it may be a question of a coded operating signal for authenticating the second device, so that after positive evaluation of the transmitted operating signal in the case of an authorized second device the locking mechanism is capable of being actuated by the first device.

In a compact configuration, the opening mechanism and the locking mechanism may have been arranged in a lock. The lock may, in turn, possess its own housing, so that in this case it is a question of a component to be produced separately. This component may then have been incorporated into the closing element in a straightforward manner.

The separate energy storage means may be an electric battery. For the purpose of further enhancement of the operational reliability, the state of the separate energy storage means may be monitored, for which purpose a diagnostic control unit may have been provided. In particular, the electric charge of the separate energy storage means may be monitored, so that in the case of an emergency sufficient electrical energy is available for the emergency. Given an appropriate requirement, the separate energy storage means is interchangeable. For the case of an emergency there may be provision that the actuator actuates the coupling mechanism for the emergency release only after positive authentication of the second device, so that the security against theft is not jeopardized, even in emergency operation.

In an expedient configuration, the handling element may be capable of being actively connected to the opening mechanism via a connecting piece which is, in particular, a metallic rod. Moreover, in a simple configuration the opening mechanism may include a blocking hook which is capable of being moved by the handling element by means of the connecting piece. The blocking hook then engages in conventional manner with a corresponding counterpart on the vehicle for the purpose of holding the closing element in place.

In the case of an emergency, one possibility that may present itself in a straightforward manner is that the coupling mechanism is capable, by means of the actuator, of being actively connected to the locking mechanism and/or to the opening mechanism for the purpose of actuating the locking mechanism. In particular, as a result the coupling mechanism can, by virtue of the coupling, transmit the motion of the connecting piece brought about by the handling element to the locking mechanism and/or to the opening mechanism. In a cost-effective configuration, the actuator may be an electric motor, an electromagnet or such like.

The present invention provides, furthermore, a method for operating a closing element, in particular for a motor vehicle.

The closing element—which may be a car door, a tailgate or such like—exhibits an opening mechanism, a locking mechanism for locking and/or unlocking the opening mechanism, and a handling element which is capable of being actively connected to the opening mechanism in such a manner that in the case of an unlocked locking mechanism the closing element is capable of being moved for the purpose of opening. The locking mechanism is actuated by means of a closing system, in particular for the authorization of access to the motor vehicle, for the purpose of locking and/or unlocking the opening mechanism. An emergency operation is provided, for example in the event of the failure of a battery for the power supply in the motor vehicle, of a battery for the power supply of the locking mechanism, of a battery for power supply of the closing system or such like. In emergency operation a coupling mechanism interacts with the locking mechanism and/or with the opening mechanism in the manner of an emergency release. For the interaction the coupling mechanism is actuated by means of an actuator. For the operation of the actuator a separate energy storage means is provided that can be used on demand.

In a further configuration of the method, in emergency operation the coupling mechanism is caused to interact substantially simultaneously with the locking mechanism and with the opening mechanism. As a result, by means of a single movement of the handling element the locking mechanism can be unlocked and the opening mechanism can be actuated for the purpose of opening the closing element.

In another further configuration of the method, in emergency operation the coupling mechanism is firstly caused to interact with the locking mechanism, so that the locking mechanism is unlocked by means of a first movement of the handling element. Subsequently the coupling mechanism is caused to interact with the opening mechanism, so that by means of a second movement of the handling element the opening mechanism can be actuated for the purpose of opening the closing element.

For a particularly preferred configuration of the invention, the following is to be noted.

An emergency-release system in respect of a vehicle door is to be developed that can be actuated without the use of an additional mechanical lock on the door handle and/or without using an emergency key. In other words, in this case it is a question of a door latch that can be unlocked without the use of an emergency key.

Hitherto the pulling motion on the door handle has been passed on to the door latch in the frame of the motor vehicle via a connecting piece, usually a metallic rod. At the door latch this motion finally brings about the release of a blocking hook and thereby enables the opening of the vehicle door. The present invention provides for coupling the motion initiated by the door handle with an emergency-release mechanism or with the existing unlocking mechanism on the door latch. Consequently the actuation of the handle then brings about both the unlocking and the opening of the vehicle door. Alternatively, an implementation is also conceivable in which unlocking takes place by virtue of the first pulling motion on the door handle, and the vehicle door is opened only by virtue of the second pulling motion. The coupling may be effected on the connecting piece for connecting the door handle to the door latch, or directly on the door latch. In normal operation of the vehicle or of the door latch, the emergency-release mechanism has been decoupled and is therefore inactive. In the case of emergency operation—for example, in the event of the failure of the car battery, of the battery in the vehicle key etc.—an actuator, which is preferentially an electric motor, provides for the control of the coupling, in order nevertheless to be able to unlock and/or open the vehicle door. The actuator is supplied with energy as required by a separate energy storage means and is only activated as soon as the driver and/or the user has accredited himself/herself as a person authorized for access.

In the case of the present invention, a coupling mechanism has been created for realizing an emergency release for a closing element.

The advantages achieved with the present invention consist, in particular, in the fact that, by reason of the coupling of the emergency release with the door handle or with the opening mechanism, the use of an additional mechanical emergency lock on the door handle, and/or the associated emergency key, can be dispensed with. The emergency release and/or the emergency opening is/are realized in emergency operation by actuation of the door handle once or alternatively twice, so that also in the case of an emergency the convenience for the user is preserved. Through the use of an additional energy storage means, it is possible to activate the coupling mechanism at any desired time and/or to enable entry to the vehicle also to one accredited person only. On the other hand, in the case of motor-vehicle door closures known hitherto, which likewise have an emergency mode, an entry by non-accredited persons is also possible. Hence the present invention enhances both the operational reliability and the security against theft.

BRIEF DESCRIPTION OF THE DRAWINGS

Exemplary embodiments of the present invention with various further developments and configurations are represented in the drawings and will be described in more detail in the following. Shown are.

DETAILED DESCRIPTION OF THE INVENTION

Figure 1:
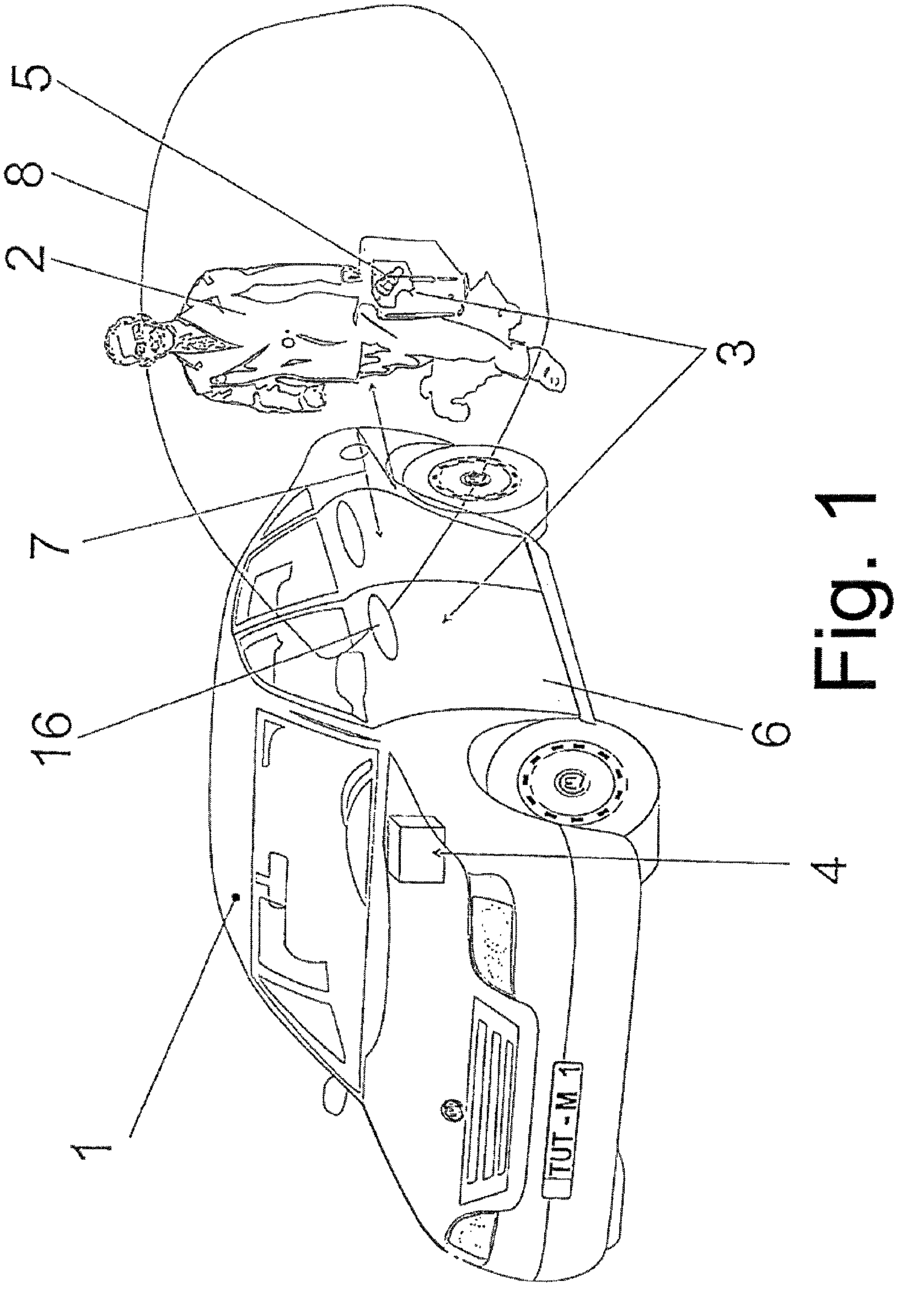
FIG. 1 a motor vehicle equipped with a closing element.

In FIG. 1, a motor vehicle 1 with the authorized user 2 can be seen. For the access authorization, the motor vehicle 1 has been provided with a closing system 3 in the form of a door-closing system which includes a first device 4, designed as a control device, and an associated second device 5. The second device 5 is designed in the manner of an electronic key, an identification transducer, a chip card, a smart card or such like. The second device 5 is located in the possession of the authorized user 2, by virtue of which the latter has access to the motor vehicle 1 within an active zone 8.

The first device 4 has at least two states, a locking of the car doors 6 obtaining in the first state, and an unlocking of the car doors 6 obtaining in the second state. For their designated operation, the two devices 4, 5 possess transmitters and/or receivers for transmitting and/or receiving signals 7 by means of an electromagnetic carrier wave. In the case of at least one of these signals 7 transmitted between the second device 5 and the first device 4 it is a question of a coded electromagnetic operating signal. The coded operating signal 7 serves for authenticating the second device 5, by virtue of which in the case of an authorized second device 5 a change of state of the first device 4 can be brought about after positive evaluation of the transmitted operating signal 7. The transmission of the coded operating signal 7 takes place when the authorized user 2 actuates the door handle 16, serving as handling element, on the car door 6, or approaches the door handle 16. As a result, the unlocking of the car doors 6 in accordance with the keyless-entry functionality is triggered. The transmission of the coded operating signal 7 may equally well take place automatically, without involvement of the user 2, as soon as the latter enters the active zone 8, but this will not be considered in any detail in the following. If the user 2 closes the car doors 6 from outside, an automatic locking of the car doors 6 takes place. Equally, the automatic locking of the car doors 6 may take place after the user 2 has left the active zone 8.

The closing system 3 furthermore establishes the authorization to drive in respect of the motor vehicle 1. For this purpose, the first device 4, designed as a control device, brings about the unlocking and/or locking of the ignition lock (electronic ignition lock) and/or of the steering-wheel locking system (electric steering-wheel locking system), likewise corresponding to the two states. Equally, some other functionally relevant component of the motor vehicle 1 can be driven accordingly by the first device 4. For example, an enabling and/or disabling of an immobilizer, of the engine control unit or such like may occur as a result. The transmission of the coded operating signal 7 for authenticating the second device 5 takes place when the authorized user 2 is located in the motor vehicle 1 and actuates a start/stop switch. As a result, the starting procedure or such like of the motor vehicle 1 in accordance with the keyless-go functionality is triggered.

The transmission of the signals 7 for the keyless-entry/keyless-go functionality is triggered by actuation of a switch and/or of a sensor by the user 2. For the access authorization, it may be a question, for example, of the manual actuation of the door handle 16, of the tailgate handle or such like. For this purpose a switch is arranged in the door handle 16, tailgate handle or such like of the motor vehicle 1. If use is made of a proximity sensor operating capacitively, for example, the approach of a hand of the user 2 to the door handle 16 or to the tailgate handle can be detected by the sensor. For the authorization to drive, the start/stop switch which is capable of being actuated manually by the user 2 is located in the motor vehicle 1. The start/stop switch is expediently arranged on the gear selector lever, on the ignition lock, in the instrument panel, in the center console or such like in the motor vehicle 1.

Figure 2:
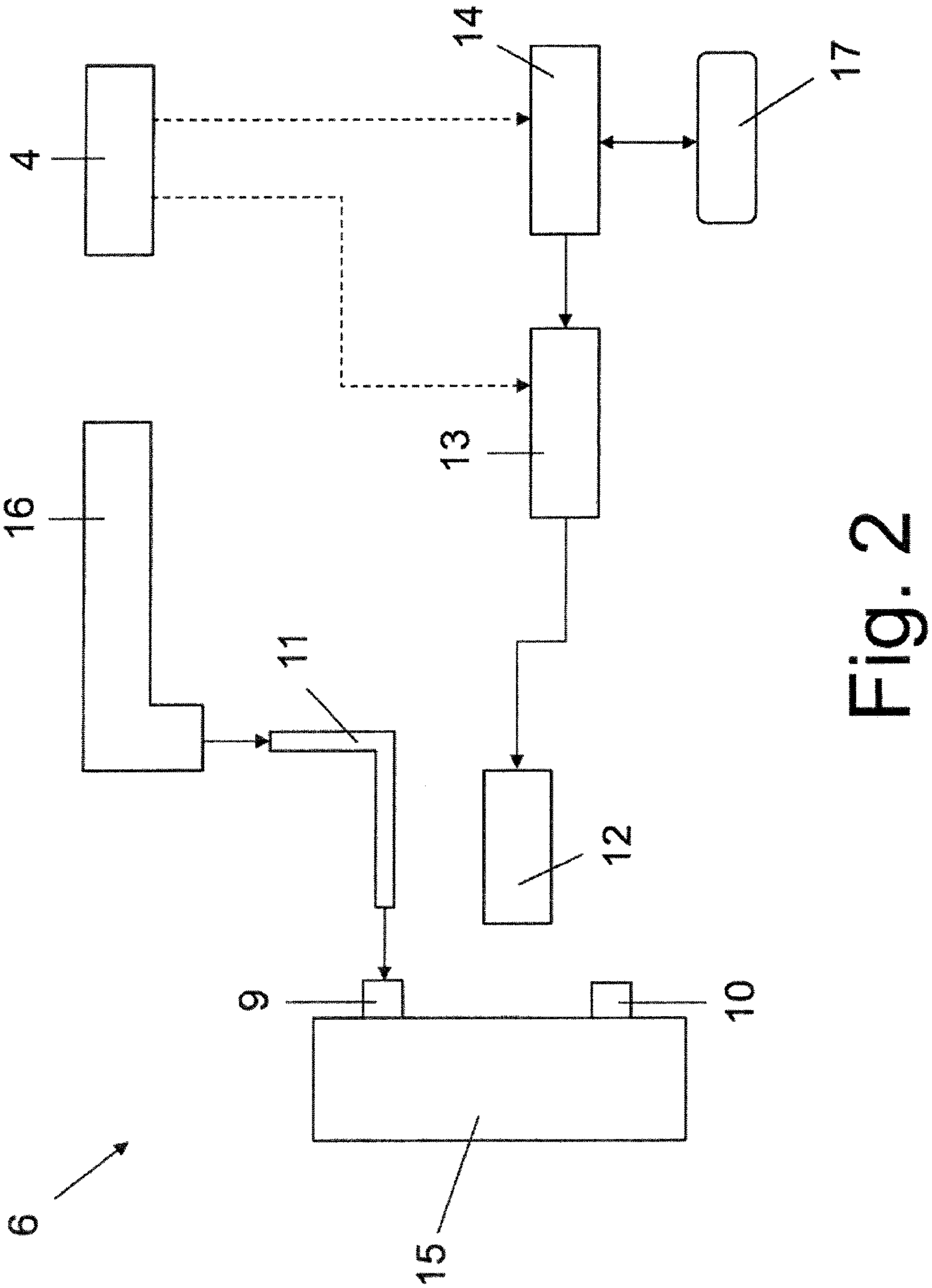
FIG. 2 a schematic block diagram of the closing element.

The car door 6, the tailgate or such like of the motor vehicle 1 will also be designated generally in the following as a closing element 6. If the mobile closing element 6 is closed, access to the motor vehicle 1 is prevented. If the closing element 6 is open, access to the motor vehicle 1 is made possible. As can be seen in FIG. 2, the closing element 6 is provided with an opening mechanism 9 and with a locking mechanism 10 for locking and/or unlocking the opening mechanism 9. The handling element 16 for the closing element 6 is capable of being actively connected to the opening mechanism 9 via a connecting piece 11 which, in particular, is a metallic rod. The opening mechanism 9 further includes a blocking hook which is capable of being moved by the handling element 16 by means of the connecting piece 11 and which is not shown in any detail. As a result, the closing element 6 is capable of being moved by means of the handling element 16 for the purpose of opening, in order in this way to enable access to the motor vehicle 1 for the user 2, provided the opening mechanism 9 has been unlocked. If, on the other hand, the opening mechanism 9 has been locked, an opening of the closing element 6 by means of the handling element 16 is not possible. As already mentioned, after positive evaluation of the transmitted operating signal 7 in the case of an authorized second device 5 the locking mechanism 10 is capable of being actuated by the first device 4 for the purpose of unlocking and/or locking the opening mechanism 9.

The closing system 3 requires a power supply for its operation. For this purpose, a battery which supplies the first device 4 with electrical energy is provided in the motor vehicle 1. In the second device 5 a battery for the power supply thereof is likewise provided. In the event of a failure of the battery in the motor vehicle 1 and/or of the battery in the second device 5, an operation of the closing system 3 is consequently no longer possible, by virtue of which an actuation of the locking mechanism 10 for unlocking the opening mechanism 9 is also not possible. In order to enable an emergency operation with an emergency release of the opening mechanism 9 for such a case, a coupling mechanism 12 is provided for interacting with the locking mechanism 10 and/or with the opening mechanism 9. The coupling mechanism 12 is capable of being actuated by means of an actuator 13 for the case of an emergency. For the operation of the actuator 13, a separate energy storage means 14 is provided that can be used on demand for the case of an emergency, the energy storage means 14 being an electric battery.

The opening mechanism 9 and the locking mechanism 10 are arranged in a lock 15 or in a door latch configured as a unit, the lock 15 being incorporated within the closing element 6. The state of the separate energy storage means 14, and in particular the electric charge thereof, is monitored by means of a diagnostic control unit 17 in such a manner that the separate energy storage means 14 is interchangeable as required. As a result, it is ensured that the emergency release is always operational. In the present case, the actuator 13 is an electric motor or an electromagnet. In order that the security against theft in respect of the motor vehicle 1 is preserved, the actuator 13 actuates the coupling mechanism 12 for the emergency release also in the case of an emergency only after positive authentication of the second device 5.

Figure 3:
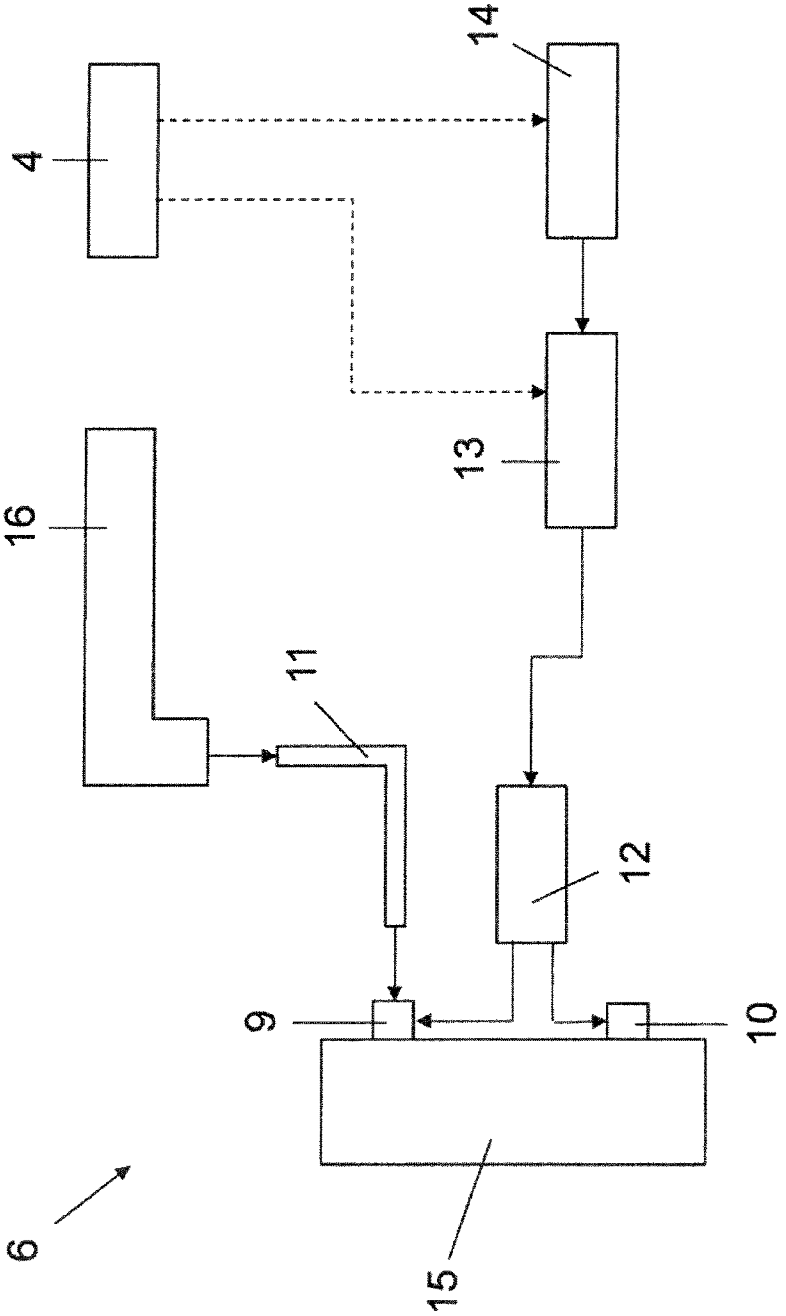
FIG. 3 the emergency operation of the closing element according to FIG. 2 in a first implementation.

In a first implementation, which can be seen in greater detail in FIG. 3, in the case of an emergency the coupling mechanism 12 is capable of being actively connected, by means of the actuator 13, to the locking mechanism 10 and to the opening mechanism 9 for the purpose of actuating the locking mechanism 10 and/or the opening mechanism 9. The coupling mechanism 12 consequently couples both the locking mechanism 10 and the opening mechanism 9 with the handling element 16 and transmits the motion of the connecting piece 11 brought about by the handling element 16 to the locking mechanism 10 and to the opening mechanism 9. As a result, the motion of the handling element 16 simultaneously brings about the unlocking of the locking mechanism 10 and also the actuation of the opening mechanism 9 for opening the closing element 6.

Figure 4:
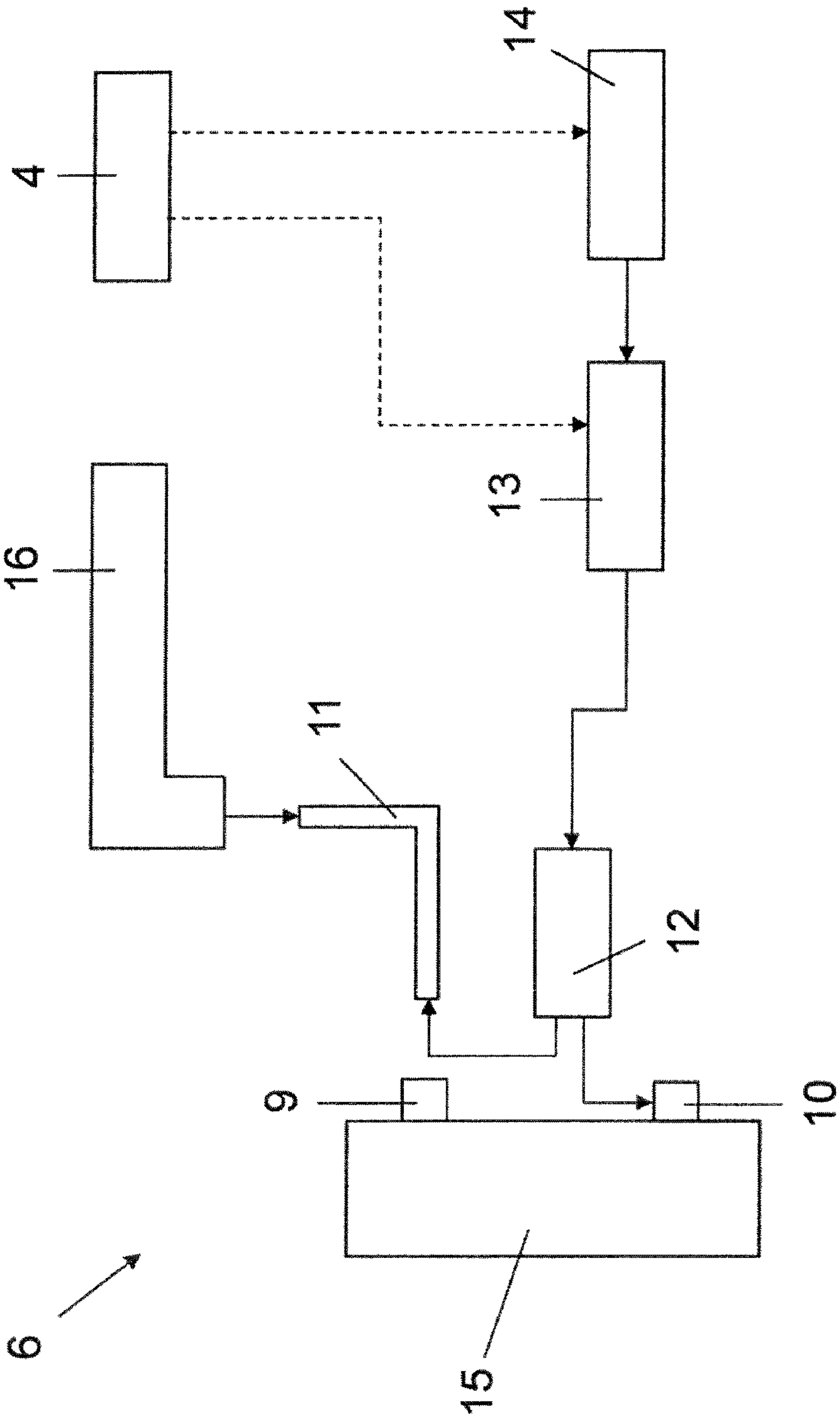
FIG. 4 the emergency operation of the closing element according to FIG. 2 in a second implementation during the emergency release.
Figure 5:
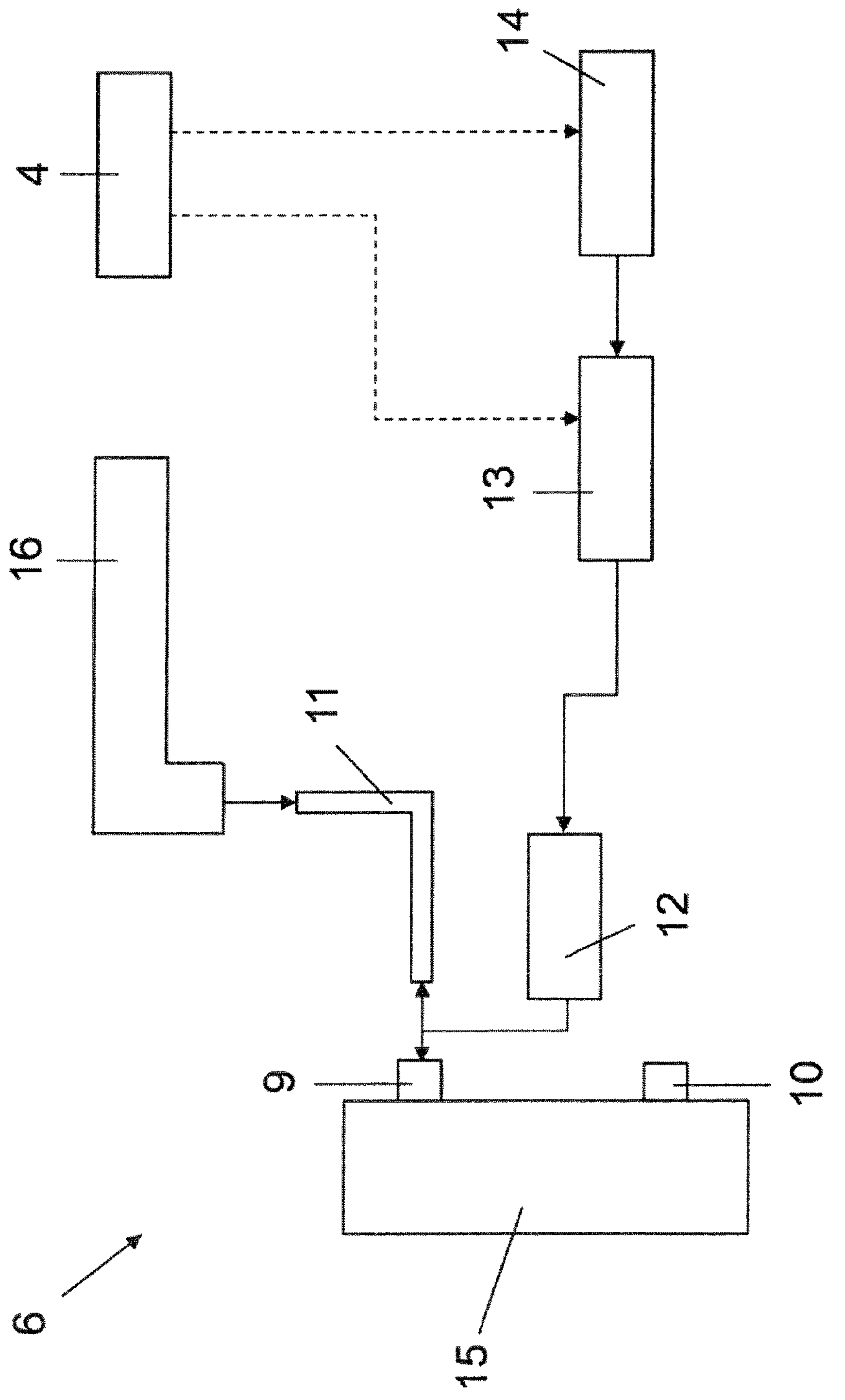
FIG. 5 the emergency operation of the closing element according to FIG. 4 after the emergency release.

In a second implementation, which can be seen in greater detail in FIG. 4 and FIG. 5, in the case of an emergency the coupling mechanism 12 is firstly capable of being actively connected, by means of the actuator 13, to the locking mechanism 10 for the purpose of actuating the locking mechanism 10. As a result, according to FIG. 4, in the course of the first movement of the handling element 16 the unlocking of the locking mechanism 10 by means of the connecting piece 11 firstly takes place. Subsequently the coupling mechanism 12 according to FIG. 5 couples the handling element 16 with the opening mechanism 9 and transmits the motion of the connecting piece 11 brought about by the handling element 16 to the opening mechanism 9. As a result, the second movement of the handling element 16 brings about the actuation of the opening mechanism 9 for opening the closing element 6.

The present invention is not restricted to the exemplary embodiments described and represented. The present invention also encompasses, furthermore, all further developments by those skilled in the art within the scope of the claims. Accordingly, a closing element of such a type can be employed not only in the motor vehicle. A use is also possible in respect of a door that is located, for example, on a real-estate property or such like, or for emergency release in respect of other lockable objects.

LIST OF REFERENCE SYMBOLS

1 motor vehicle
2 authorized user
3 locking system
4 first device
5 second device/key
6 car door/closing element
7 operating signal
8 active zone
9 opening mechanism
10 locking mechanism
11 connecting piece
12 coupling mechanism
13 actuator
14 energy storage means
15 lock
16 door handle/handling element
17 diagnostic control unit

The invention claimed is:

1. A closing element for a motor vehicle, comprising:

an opening mechanism, a locking mechanism for, locking and/or unlocking the opening mechanism, and a handling element actively connected to the opening mechanism via a connecting piece, which is a metallic rod, such that a first mechanical coupling to the handling element is provided in such a manner that in the case of an unlocked locking mechanism the closing element can be moved for the purpose of opening, wherein the locking mechanism is actuated by a closing system for the authorization of access to the motor vehicle, for the purpose of locking and/or unlocking the opening mechanism, said closing element further comprising a coupling mechanism actively connected via an actuator to the locking mechanism and to the opening mechanism in the manner of an emergency release, wherein the coupling mechanism is actuated by the actuator so as to have both the locking mechanism and the opening mechanism respectively coupled to the coupling mechanism, such that movement of the handling element is transmitted via the connecting piece to the locking mechanism and to the opening mechanism to provide a second mechanical coupling to the handling element in the emergency release, and wherein for the operation of the actuator a separate energy storage device is provided that can be used on demand.

2. The closing element according to claim 1, wherein the closing system includes a control device for the actuation of the locking mechanism, and an associated device, wherein the two devices include transmitters and/or receivers for electromagnetic signals, and wherein at least one of the signals transmitted between the associated device and the control device is a coded operating signal for authenticating the associated device, so that after positive evaluation of the transmitted operating signal in the case of an authorized associated device the locking mechanism is actuated by the control device.

3. The closing element according to claim 1, wherein the opening mechanism and the locking mechanism are arranged in a lock, and the actuator is one of an electric motor and an electromagnet.

4. The closing element according to claim 1, wherein the separate energy storage device is an electric battery, and a diagnostic control unit for monitoring the electric charge state of the separate energy storage device is provided in such a manner that the separate energy storage device is interchangeable as required.

5. The closing element according to claim 2, wherein the actuator actuates the coupling mechanism for the emergency release only after positive authentication of the associated device.

6. The closing element according to claim 1, wherein the handling element is actively connected to the opening mechanism via the connecting piece, and the opening mechanism includes a blocking hook which is movable by the handling element via the connecting piece.

7. The closing element according to claim 1, wherein the emergency release is used for an emergency operation selected from failure of a battery for the power supply of the motor vehicle, failure of a battery for the power supply of the locking mechanism, and failure of a battery for the power supply of the closing system.

8. The closing element according to claim 2, wherein the associated device is one of an electronic key, and ID transducer, and a chip card.

* * * * *